US012791361B2

(12) United States Patent
Engelsgjerd

(10) Patent No.: US 12,791,361 B2
(45) Date of Patent: Nov. 10, 2026

(54) DEVICE AND A METHOD FOR DETERMINING ROTATIONAL POSITION OF A ROTATING SHAFT

(71) Applicant: AutoStore Technology AS, Nedre Vats (NO)

(72) Inventor: Svein Engelsgjerd, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 75 days.

(21) Appl. No.: 18/842,103

(22) PCT Filed: Feb. 17, 2023

(86) PCT No.: PCT/EP2023/054071
§ 371 (c)(1),
(2) Date: Aug. 28, 2024

(87) PCT Pub. No.: WO2023/161154
PCT Pub. Date: Aug. 31, 2023

(65) Prior Publication Data

US 2025/0180382 A1 Jun. 5, 2025

(30) Foreign Application Priority Data

Feb. 28, 2022 (NO) .................................... 20220259

(51) Int. Cl.
*G01D 5/28* (2006.01)
*B65G 1/04* (2006.01)

(52) U.S. Cl.
CPC ........... *G01D 5/285* (2013.01); *B65G 1/0492* (2013.01); *G01D 2205/22* (2021.05)

(58) Field of Classification Search
CPC ............... G01D 2205/22; G01D 5/285; G01D 2205/777; G01D 2205/773; B65G 1/0492; G01S 17/66
See application file for complete search history.

(56) References Cited

U.S. PATENT DOCUMENTS 5,283,796 A * 2/1994 Fink ........................ H01S 3/105 372/98
5,983,720 A * 11/1999 Crabb .................... G01D 5/285 356/138

(Continued)

FOREIGN PATENT DOCUMENTS

DE 3920627 A1 1/1990
DE 102018124232 A1 4/2020

(Continued)

OTHER PUBLICATIONS

International Searching Authority, Written Opinion for International application No. PCT/EP2023/054071, mailed May 16, 2023, 6 pages, European Patent Office, Munich, DE.

(Continued)

*Primary Examiner* — Maurice C Smith
(74) *Attorney, Agent, or Firm* — Baker Botts L.L.P.

(57) ABSTRACT

The invention relates to a position sensing device (10) for determining a rotational position of a rotating shaft (12) of a remotely operated vehicle of a system (1) for storing and retrieving goods holders, said rotating shaft (12) being a wheel axle of the remotely operated vehicle. The device comprises a reflector (14) attached to the rotating shaft so as to rotate simultaneously with said shaft (12), a distance measuring unit (16) arranged to emit a beam (18) of radiation towards a portion of the reflector (14), wherein the emitted beam is parallel to the rotating shaft, as the shaft (12) and the reflector (14) are rotated with respect to the distance measuring unit (16), and to receive a return beam (20) generated when the emitted beam (18) is reflected by the portion of the reflector (14). The distance measuring unit (16) is configured to output a signal based on a distance of said beam to said portion of the reflector (14), wherein a rotational position of the rotating shaft (12) is determined based on the output signal of measured distance from said (Continued)

distance measuring unit (16). The invention further relates to a method for determining rotational position of a rotating shaft (12).

15 Claims, 5 Drawing Sheets

(56) References Cited

U.S. PATENT DOCUMENTS

| | | | | |
|---|---|---|---|---|
| 6,211,794 | B1 * | 4/2001 | DeSoto | G01D 5/145 340/686.3 |
| 2019/0033099 | A1 | 1/2019 | Engstrand | |
| 2019/0234768 | A1 * | 8/2019 | Fontanet | G01D 5/2053 |

FOREIGN PATENT DOCUMENTS

| | | | |
|---|---|---|---|
| DE | 102018131708 | A1 | 6/2020 |
| EP | 2372314 | A2 | 10/2011 |
| JP | H06265370 | A | 9/1994 |
| JP | H0743134 | A | 2/1995 |
| JP | H08193843 | A | 7/1996 |
| NO | 317366 | B1 | 10/2004 |
| WO | 2014075937 | A1 | 5/2014 |
| WO | 2014090684 | A1 | 6/2014 |
| WO | 2015193278 | A1 | 12/2015 |
| WO | 2016120075 | A1 | 8/2016 |
| WO | 2018146304 | A1 | 8/2018 |
| WO | 2019206487 | A1 | 10/2019 |

OTHER PUBLICATIONS

International Searching Authority, International Search Report for International application No. PCT/EP2023/054071, mailed May 16, 2023, 4 pages, European Patent Office, Rijswijk, NL.

International Preliminary Examining Authority, International Preliminary Report on Patentability for International application No. PCT/EP2023/054071, mailed Nov. 29, 2023, 18 pages, European Patent Office, Munich, DE.

Bjørn S. Andersen, Office Action in Norwegian Patent Application No. 20220259, mailed May 5, 2023, 3 pages, Norwegian Industrial Property Office, Oslo, NO.

Bjørn S. Andersen, Office Action and Norwegian Search Report in Norwegian Patent Application No. 20220259, mailed Aug. 29, 2022, 9 pages, Norwegian Industrial Property Office, Oslo, NO.

Anonymous, "Designing VCLN4000 into an Application," pub. by Vishay Semiconductors, Malvern, Pennsylvania, USA, Mar. 28, 2011, 12 pages.

* cited by examiner

DEVICE AND A METHOD FOR DETERMINING ROTATIONAL POSITION OF A ROTATING SHAFT

The present invention relates to a device and a method for determining rotational position of a rotating shaft of an equipment being part of a system for storing and retrieving goods holders.

BACKGROUND AND PRIOR ART

FIG. 1 discloses a prior art automated storage and retrieval system 1 with a framework structure 100 and FIGS. 2, 3*a*-3*b* disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form container stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 301, 401 in a first direction X across the top of the frame structure 100, and a second set of parallel rails 111 arranged perpendicular to the first set of rails 110 to guide movement of the container handling vehicles 301, 401 in a second direction Y which is perpendicular to the first direction X. Containers 106 stored in the columns 105 are accessed by the container handling vehicles 301, 401 through access openings 112 in the rail system 108. The container handling vehicles 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable lateral movement of the container handling vehicles 201, 301, 401 in the X direction and in the Y direction, respectively. In FIGS. 2-3*b*, two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time. In the art, lifting and lowering of the set of wheels, in order to change direction of movement of the container handling vehicle 201, 301, 401 from X-direction to Y-direction or vice versa, is known as “trackshift”.

Each prior art container handling vehicle 201, 301, 401 also comprises a lifting device 304, 404 (visible in FIGS. 3*a*-3*b*) having a lifting frame part 304*a* for vertical transportation of storage containers 106, e.g. raising a storage container 106 from, and lowering a storage container 106 into, a storage column 105. Lifting bands 404*a* are also shown in FIG. 3*b*. The lifting device 304, 404 comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z (visible for instance in FIG. 1) which is orthogonal the first direction X and the second direction Y. Parts of the gripping device of the container handling vehicles 301, 401 are shown in FIGS. 3*a* and 3*b* indicated with reference numbers 304 and 404. The gripping device of the container handling device 201 is located within the vehicle body 201*a* in FIG. 2.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=18, Y=1, Z=6. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 3*b* and as described in e.g. WO2015/193278A1 and WO2019/206487A1, the contents of which are incorporated herein by reference.

FIG. 3*a* shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term ‘lateral’ used herein may mean ‘horizontal’.

Alternatively, the cavity container handling vehicles 401 may have a footprint which is larger than the lateral area defined by a storage column 105 as shown in FIG. 3*b* and as disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks; in other rail systems 108, each rail in one direction may comprise one track and each rail in the other perpendicular direction may comprise two tracks. The rail system may also comprise a double track rail in one of the X or Y direction and a single track rail in the other of the X or Y direction. A double track rail may comprise two rail members, each with a track, which are fastened together.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or a dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are, once accessed, returned into the framework structure 100. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different heights, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After storage containers 106 positioned at or above the target position within the stack 107 have been removed, the container handling vehicle 201, 301, 401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106 and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 (shown in FIG. 1) which typically is computerized and which typically comprises a database for keeping track of the storage containers 106.

The container handling vehicles 201, 301, 401 have numerous rotating axles, such as axles associated with the respective set of wheels 201*b*, 201*c*, 301*b*, 301*c*, 401*b*, 401*c* (two axles per set of wheels). There are various ways of keeping track of rotational position of these axles. By way of example, pulse counters/encoders may be used to monitor rotational position/speed of an axle. However, modern, high-resolution pulse counters/encoders are constructionally complex and their use can introduce inaccuracies. Such an encoder is disclosed in WO2016120075A1.

JPH0743134A is from a remote technical field and discloses an overly constructionally complex rotation angle tracker.

In view of the above, it is desirable to provide a solution that solves or at least mitigates the aforementioned problems belonging to the prior art.

SUMMARY OF THE INVENTION

The present invention is set forth and characterized in the independent claims, while the dependent claims describe other characteristics of the invention.

A first aspect of the invention relates to a position sensing device for determining a rotational position of a rotating shaft of a remotely operated vehicle of a system for storing and retrieving goods holders, said rotating shaft being a wheel axle of the remotely operated vehicle, wherein said position sensing device comprises: a reflector attached to the rotating shaft so as to rotate simultaneously with said shaft, a distance measuring unit arranged to emit a beam of radiation towards a portion of the reflector, as the shaft and reflector are rotated with respect to the distance measuring unit, wherein the emitted beam is parallel to the rotating shaft, and to receive a return beam generated when the emitted beam is reflected by the portion of the reflector, the distance measuring unit being configured to output a signal based on a distance of said beam to said portion of the reflector, wherein a rotational position of the rotating shaft is determined based on the output signal of measured distance from said distance measuring unit.

By providing the device as defined above, a number of advantages is achieved.

More specifically, a robust device for high resolution measurement is achieved, the performance of the device not being negatively affected by presence of dust and/or debris.

In addition and in contrast to the current art, as represented by WO2016120075A1, use of the device as claimed doesn't introduce errors into the position determining system.

Moreover, the structural details of the element may be easily modified in accordance with system needs. By way of example, reflector surface may be made wavy and/or stepped.

Furthermore, the reflector may be integrally formed with the wheel axle and arranged at an end of said axle. In addition to achieving space savings, this confers a more robust axle design, less prone to breakage. A reflector in accordance with this embodiment is substantially cylindrically-shaped and doesn't radially extend beyond outer surface of the axle.

A second aspect of the invention relates to a method for determining rotational position of a rotating shaft of a remotely operated vehicle of a system for storing and retrieving goods holders, wherein a reflector is attached to the rotating shaft, the reflector rotating simultaneously with said shaft and said rotating shaft being a wheel axle of the remotely operated vehicle, said method comprising:

- providing a distance measuring unit for measuring a distance to said reflector by emitting a beam of radiation towards a portion of the reflector as the shaft and reflector are rotated with respect to the distance measuring unit, the emitted beam being parallel to the rotating shaft, and by receiving a return beam generated when the emitted beam is reflected by the portion of the reflector, the distance measuring unit being configured to output a signal based on a distance of said beam to said portion of the reflector, and
- determining a rotational position of the rotating shaft based on the output signal of measured distance of said distance measuring unit.

For the sake of brevity, advantages discussed above in connection with the device as defined above may also be associated with the method and are not further discussed.

For the purposes of this application, the term "container handling vehicle" used in "Background and Prior Art"-section of the application and the term "remotely operated vehicle" used in "Detailed Description of the Invention"-section both define a robotic wheeled vehicle operating on a rail system arranged across the top of the framework structure being part of an automated storage and retrieval system.

Analogously, the term "storage container" used in "Background and Prior Art"-section of the application and the term "goods holder" used in "Detailed Description of the Invention"-section both define a receptacle for storing items. In this context, the goods holder can be a bin, a tote, a pallet, a tray or similar. Different types of goods holders may be used in the same automated storage and retrieval system.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
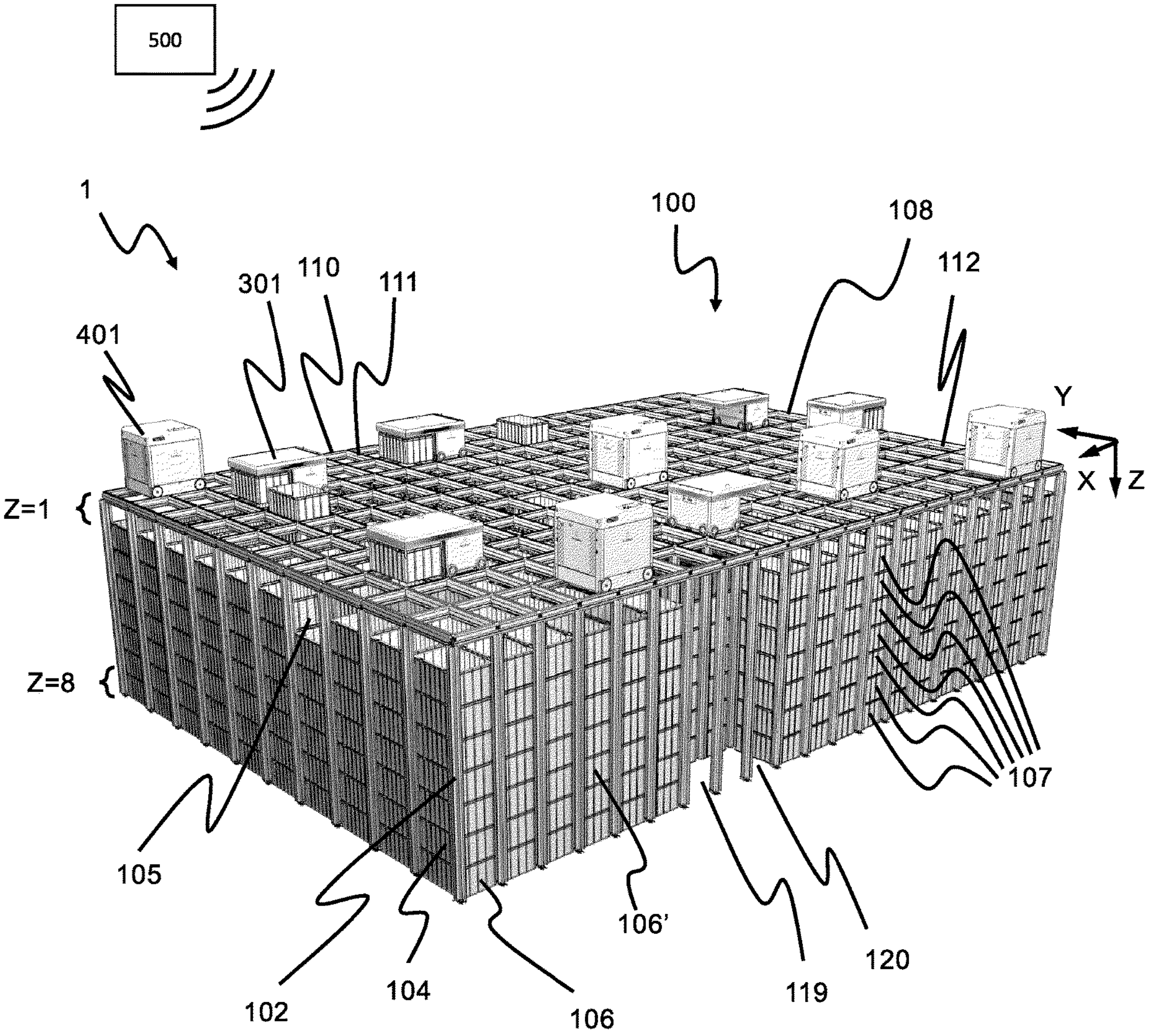
Fig. 1 (Prior Art)
FIG. 1 is a perspective view of a framework structure of a prior art automated storage and retrieval system.
Figure 2:
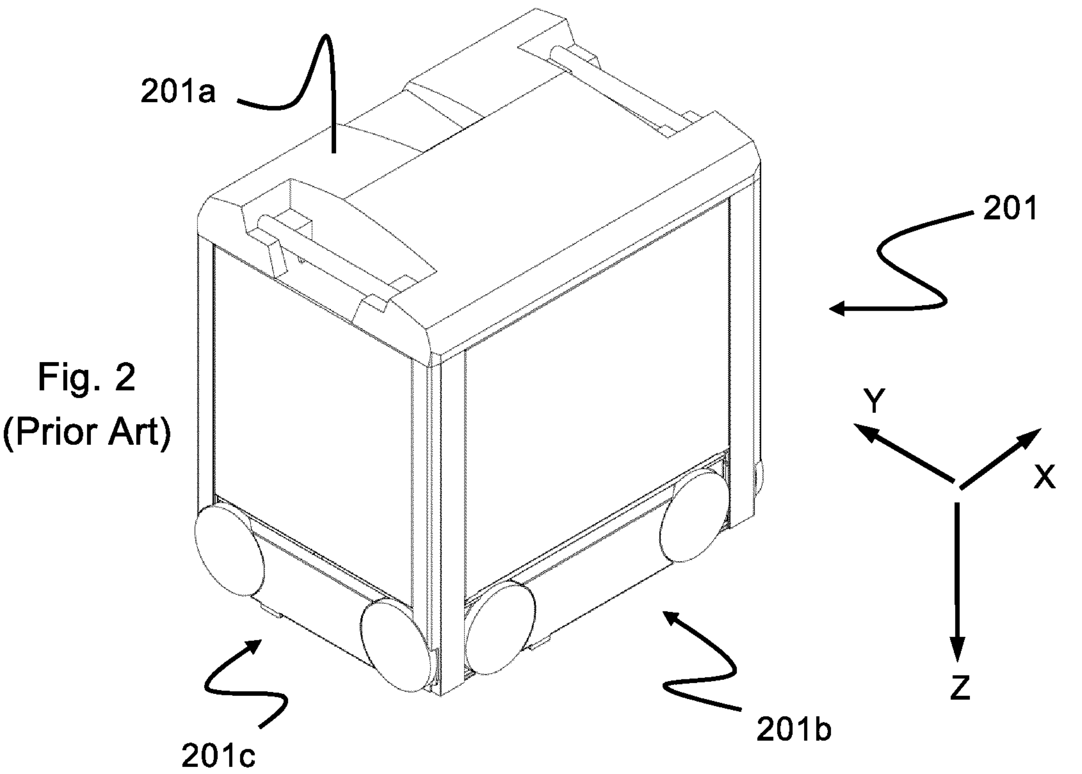
Fig. 2 (Prior Art)
FIG. 2 is a perspective view of a prior art container handling vehicle/remotely operated vehicle having a centrally arranged cavity for carrying storage containers therein.
Figure 3A:
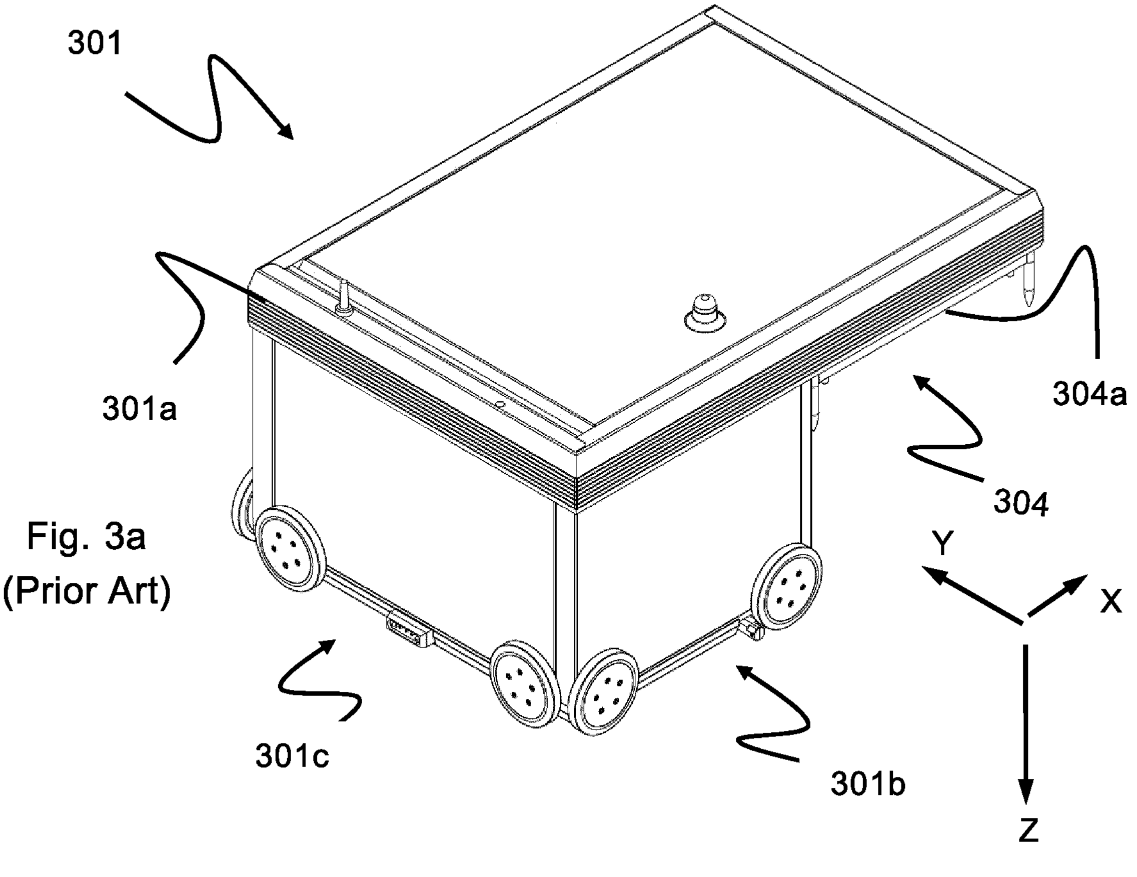
Fig. 3a (Prior Art)
FIG. 3*a* is a perspective view of a prior art container handling vehicle/remotely operated vehicle having a cantilever for carrying storage containers underneath.
Figure 3B:
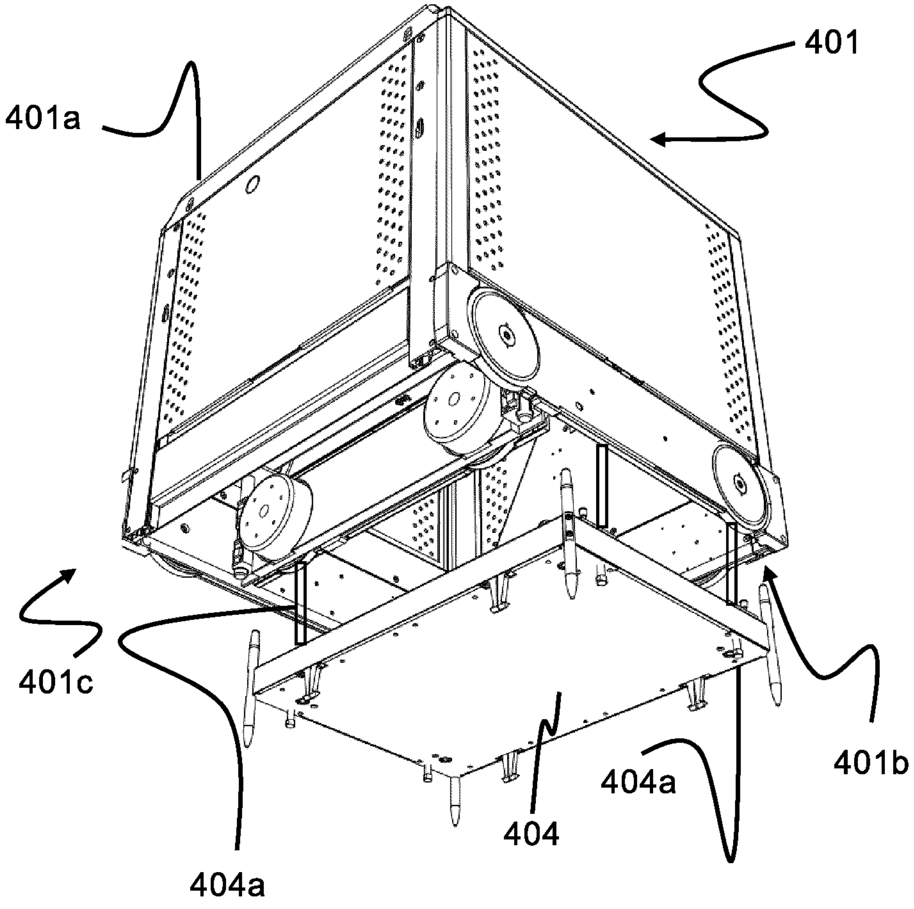
Fig. 3b (Prior Art)
FIG. 3*b* is a perspective view, seen from below, of a prior art container handling vehicle/remotely operated vehicle having an internally arranged cavity for carrying storage containers therein.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3*b*, i.e. a number of upright members 102, wherein the framework structure 100 also comprises a first, upper rail system 108 in the X direction and Y direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

Various aspects of the present invention will now be discussed in more detail with reference to FIGS. 4*a*-5.

Figure 4A:
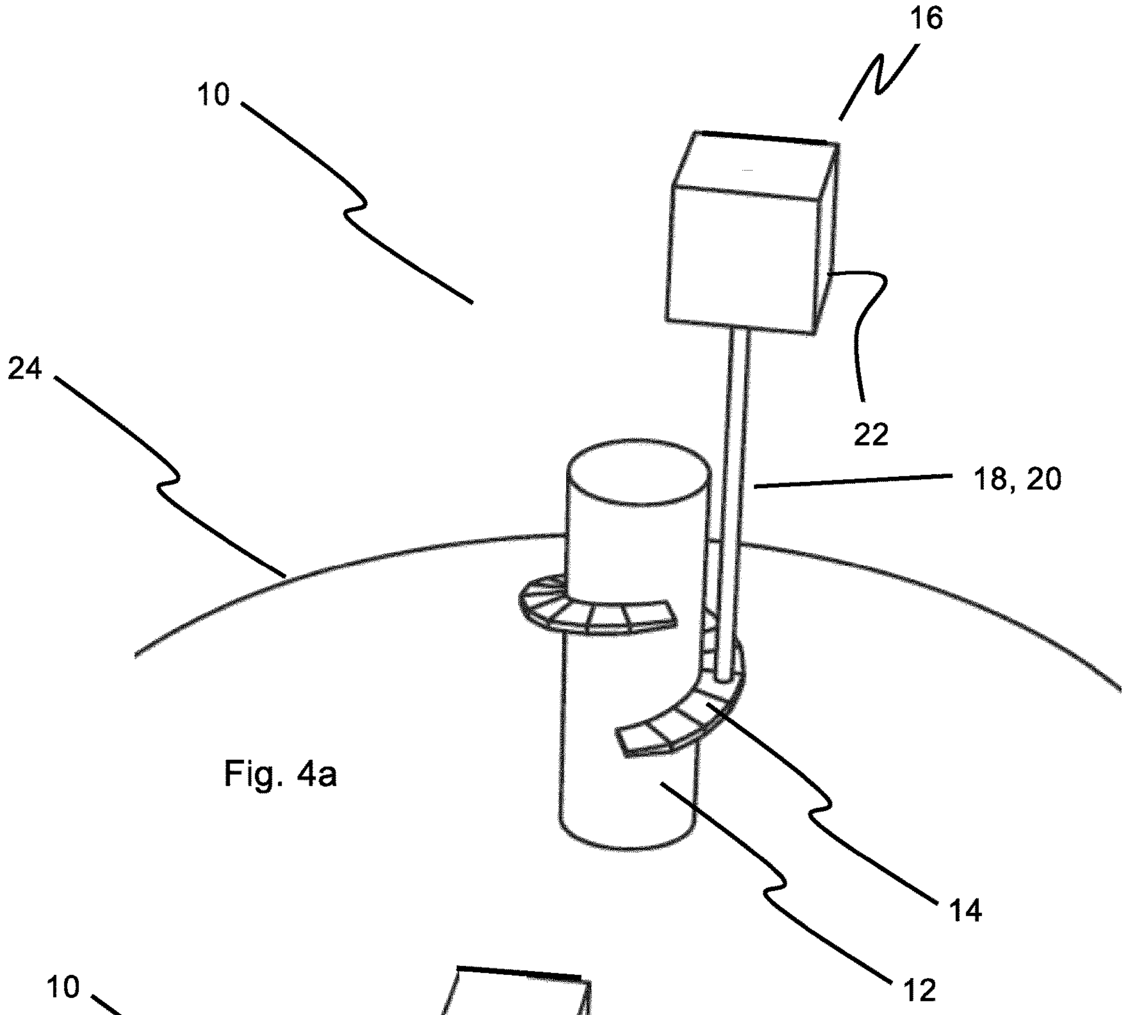
FIG. 4*a* is a perspective view of a first embodiment of a position sensing device for determining a rotational position of a rotating shaft when fixedly attached to said shaft.

FIG. 4*a* is a perspective view of a first embodiment of a position sensing device 10 for determining a rotational position of a rotating shaft 12 when fixedly attached to said shaft 12. The position sensing device 10 is for determining a rotational position of a rotating shaft 12 of a vehicle of a system 1 for storing and retrieving goods holders. Typically, said vehicle is a remotely operated vehicle of the type shown in FIGS. 1-3*b* and the rotating shaft 12 is a wheel axle of such a remotely operated vehicle. A section of the wheel 25 is also shown.

The position sensing device 10 of FIG. 4*a* comprises a reflector 14 projecting from a circumferential surface of the rotating shaft 12 and extending around the circumferential surface of the rotating shaft 12 so as to rotate simultaneously with said shaft 12. The device 10 further comprises a distance measuring unit 16 that emits a beam of radiation 18 towards a portion of the reflector 14, as the shaft 12 and the reflector 14 are rotated with respect to the distance measuring unit 16 and receives a return beam 20 generated when the emitted beam 18 is reflected by the portion of the reflector 14.

The reflector 14 shown in FIG. 4*a* is helix-shaped with a circular, right-handed helix. In the shown embodiment, number of turns of the helix is a decimal numeral between 1 and 2. The sensor device 10 has the advantage that the sensor fitter need not be overly thorough when fitting the reflector 14—a strong, consistent signal will be received regardless of the relative position of the reflector 14 when fitted to the shaft 12.

In an embodiment, said portion of the reflector 14 has an irregular surface facing the distance measuring unit 16. By way of example, said surface could be wavy and/or stepped surface. In one embodiment, the wavy and the stepped surfaces are superposed. This could improve resolution of the device 10 or, alternatively, generate two different return signals.

In the shown embodiment, the distance measuring unit 16 is at least partially enclosed by a housing 22. In a related embodiment (not shown), the housing could also enclose the reflector and a section of the shaft. Hereby, total light contamination of the position sensing device 10 could be kept at a minimum.

Still with reference to FIG. 4*a*, the emitted beam 18 is substantially parallel to the rotating shaft 12. In this arrangement, the reflector 14 will not scatter the emitted beam 18 too wide and direct it back, substantially along the path it came on.

The distance measuring unit 16 of FIG. 4*a* is further configured to output a signal based on a distance of said beam 18 to said portion of the reflector 14, wherein a rotational position of the rotating shaft 12 is determined based on the output signal of measured distance from said distance measuring unit 10. Thus obtained information may subsequently be used to determine speed and/or acceleration of the wheel axle 24 and the previously-mentioned vehicle.

The above-discussed position sensing device 10 is structurally simple and robust as its performance is not negatively affected by presence of dust and/or debris. The device is capable to perform high resolution measurements.

The distance measuring unit 16 can be part of a central computer system of the remotely operated vehicle or it can be a separate, standalone unit (as shown in FIG. 4*a*).

Figure 4B:
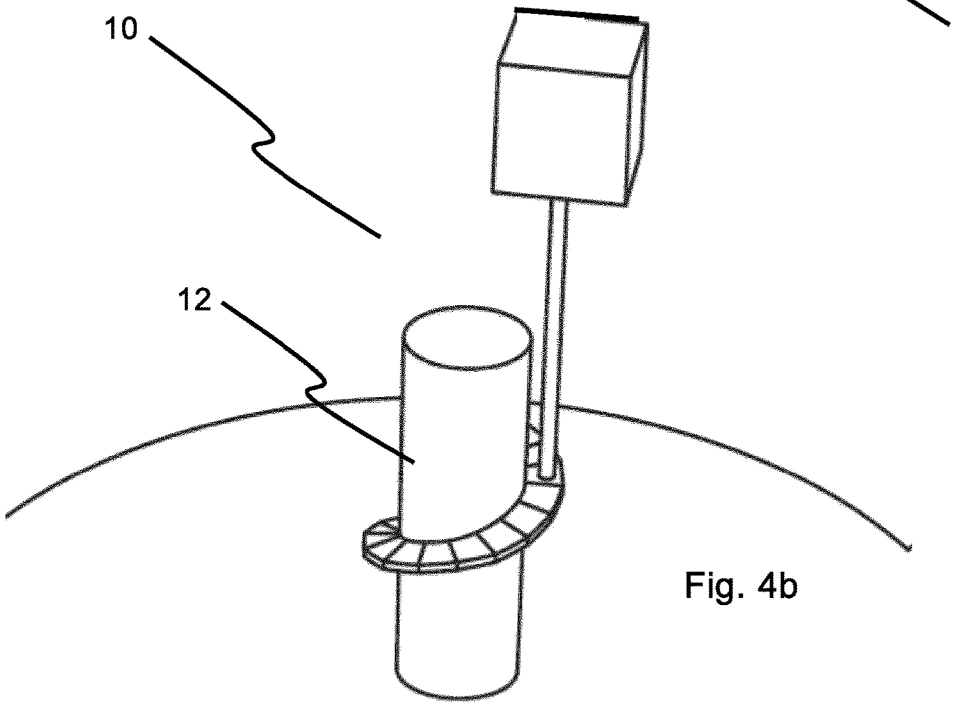
FIG. 4*b* is a perspective view of the arrangement of FIG. 4*a*, where the position sensing device and the shaft have rotated 180 degrees relative to the position shown in FIG. 4*a*.

FIG. 4*b* is a perspective view of the arrangement of FIG. 4*a*, where the position sensing device 10 and the shaft 12 have rotated 180 degrees relative to the position shown in FIG. 4*a*. For the sake of brevity, components described in connection with FIG. 4*a* are not further discussed. A rotational position of the rotating shaft in FIG. 4*b* is determined as discussed in connection with FIG. 4*a*. Thus obtained shaft position information of FIGS. 4*a* and 4*b* may be used to determine speed and/or acceleration of the axle.

In one embodiment of the invention, the beam emitter emits a light beam, preferably an IR light beam. One suitable beam emitter is part of a Vishay VCNL4000 sensor with a wavelength detection peak at around 900 nm. In an alternative embodiment, the beam emitter emits an ultrasonic beam.

Figure 5:
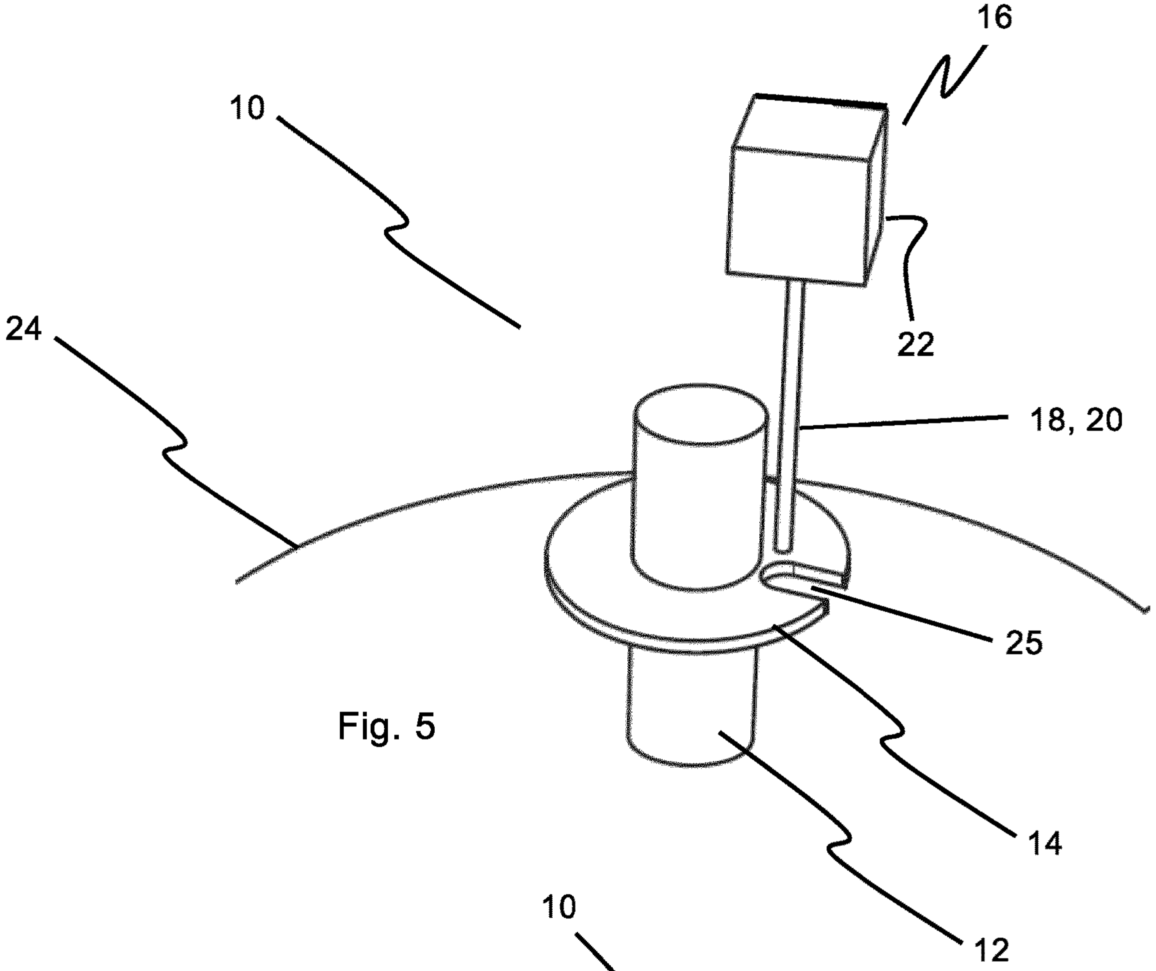
FIG. 5 is a perspective view of a second embodiment of a position sensing device for determining rotational position of a rotating shaft.

FIG. 5 is a perspective view of a second embodiment of a position sensing device 10 for determining rotational position of a rotating shaft 12. In the shown embodiment, the reflector 14 is disc-shaped and comprises a radially extending cut-out 25. In another embodiment (not shown), the cut-out made in the disc-shaped reflector extends circumferentially. Many of the features discussed above are equally applicable in the context of the disc-shaped reflector. By way of example, reflector's 14 surface may be wavy and/or stepped, a light/ultrasound beam 18 may be used. The purpose of the cut-out 25 is to reset the position sensing device 10. For the sake of brevity, components described in connection with FIG. 4*a*, and provided with reference numeral in FIG. 5, are not further discussed.

In another embodiment (not shown), a distance measuring unit is arranged to emit a further beam of radiation towards a portion of the reflector, as the shaft and reflector are rotated with respect to the distance measuring unit, and to receive a further return beam generated when the emitted further beam is reflected by the portion of the reflector. Hereby, resolution/accuracy may be even further improved.

Figure 6:
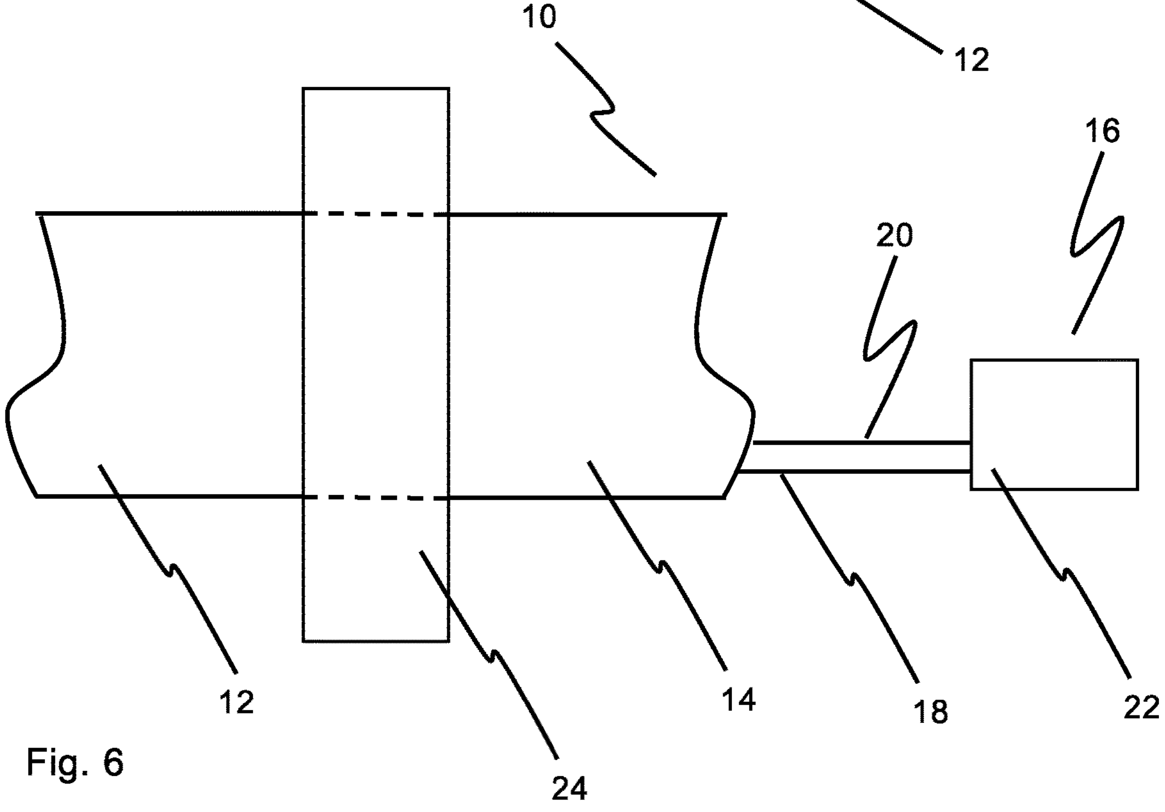
FIG. 6 is a cross-sectional view a third embodiment of a position sensing device for determining rotational position of a rotating shaft.

FIG. 6 is a cross-sectional view a third embodiment of a position sensing device 10 for determining rotational position of a rotating shaft (wheel axle) 12. More specifically, it is shown a section of the wheel axle 12, a wheel 24 itself and a reflector 14 that is integrally formed, i.e. in one piece, with the axle 12. In this embodiment, the reflector 14 is arranged at a very end of the axle 12. The reflector 14 in accordance with this embodiment is substantially cylindrically-shaped and doesn't radially extend beyond outer surface of the axle 12. In addition to achieving space savings, this embodiment confers a more robust axle design as well as easier part manufacturing and mounting. Furthermore, the assembly becomes less prone to breakage. Analogously to previously discussed embodiments, a distance measuring unit 16 is arranged to emit a beam 18 of radiation towards a portion of the reflector 14 that faces said unit 16. The emitted beam 18 is parallel to the rotating shaft 12. The distance measuring unit 16 further receives a return beam 20 generated when the emitted beam 18 is reflected by the portion of the reflector 14. As seen, said portion of the reflector 14 has an irregular surface. The emitted beam 18 is off-center 3 with respect to the wheel axle 12.

On a general level, the above-discussed position sensing device could also be employed to detect wear and tear of the axle and its components. More specifically, if an axle bearing is failing for example, its vibrations would be transferred to the axle and, in turn, make it vibrate. Hereby, external noise information would be added to the return beam reflected by the portion of the reflector. Subsequently, the distance measuring unit would separate the distance-related information from the external noise-information. Based on the external noise-information, it could be determined whether a mechanical failure of the axle is imminent.

In the preceding description, various aspects of the position sensing device 10 for determining rotational position of a rotating shaft 12 according to the invention have been described with reference to the illustrative embodiment. For purposes of explanation, specific numbers, systems and configurations were set forth in order to provide a thorough understanding of the device and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Storage and retrieval system
10 Position sensing device
12 Rotating shaft
14 Reflector
16 Distance measuring unit
18 Emitted beam
20 Reflected beam
22 Housing of the distance measuring unit
24 Wheel
25 Cut-out
100 Framework structure
102 Upright members of framework structure
104 Storage grid
105 Storage column
106 Storage container/goods holder
106' Particular position of storage container
107 Stack of storage containers
108 Rail system
110 Parallel rails in first direction (X)
111 Parallel rails in second direction (Y)
112 Access opening
119 First port column
201 Container handling vehicle belonging to prior art
201*a* Vehicle body of the container handling vehicle 201
201*b* Drive means/wheel arrangement, first direction (X)
201*c* Drive means/wheel arrangement, second direction (Y)
301 Cantilever-based container handling vehicle belonging to prior art
301*a* Vehicle body of the container handling vehicle 301
301*b* Drive means in first direction (X)
301*c* Drive means in second direction (Y)
401 Container handling vehicle belonging to prior art
401*a* Vehicle body of the container handling vehicle 401
401*b* Drive means in first direction (X)
401*c* Drive means in second direction (Y)
X First direction
Y Second direction
Z Third direction

The invention claimed is:

1. A position sensing device for determining a rotational position of a rotating shaft of a remotely operated vehicle of a system for storing and retrieving goods holders, said rotating shaft being a wheel axle of the remotely operated vehicle, wherein said position sensing device comprises:

a reflector attached to the rotating shaft so as to rotate simultaneously with said shaft, a distance measuring unit arranged to emit a beam of radiation towards a portion of the reflector, as the shaft and reflector are rotated with respect to the distance measuring unit, wherein the emitted beam is parallel to the rotating shaft, and to receive a return beam which is generated when the emitted beam is reflected by the portion of the reflector, the distance measuring unit being configured to output a signal based on a distance of said beam to said portion of the reflector, and a rotational position of the rotating shaft is determined based on the output signal of the measured distance from said distance measuring unit, wherein said portion of the reflector has an irregular surface, and wherein said reflector is integrally formed with the rotating shaft and arranged at an end of the rotating shaft and said reflector is substantially cylindrically-shaped and doesn't radially extend beyond an outer surface of the rotating shaft.

2. The position sensing device of claim 1, wherein said portion of the reflector has a wavy and/or a stepped surface.

3. The position sensing device of claim 1, wherein a surface of said reflector faces the distance measuring unit.

4. The position sensing device of claim 1, wherein the distance measuring unit is at least partially enclosed by a housing.

5. The position sensing device of claim 4, wherein the reflector is at least partially enclosed by the housing.

6. The position sensing device of claim 1, wherein the reflector projects from a circumferential surface of the rotating shaft and extends around the circumferential surface of the rotating shaft so as to rotate simultaneously with the shaft.

7. The position sensing device of claim 1, wherein the emitted beam is a light beam.

8. The position sensing device of claim 1, wherein said light beam is an IR light beam.

9. The position sensing device of claim 1, wherein the emitted beam is an ultrasonic beam.

10. The position sensing device of claim 1, wherein the reflector is disc-shaped and comprises a radially and/or a circumferentially extending cut-out.

11. The position sensing device of claim 1, wherein the reflector is helix-shaped.

12. The position sensing device of claim 11, wherein a helix of the helix-shaped reflector is circular.

13. The position sensing device of claim 11, wherein a helix of the helix-shaped reflector is right-handed.

14. The position sensing device of claim 1, wherein the distance measuring unit is arranged to emit a further beam of radiation towards a portion of the reflector, as the shaft and reflector are rotated with respect to the distance measuring unit, and to receive a further return beam which is generated when the emitted further beam is reflected by the portion of the reflector.

15. A method for determining a rotational position of a rotating shaft of a remotely operated vehicle of a system for storing and retrieving goods holders, wherein a reflector is attached to the rotating shaft, the reflector rotating simultaneously with said shaft and said rotating shaft being a wheel axle of the remotely operated vehicle, said method comprising:

providing a distance measuring unit for measuring a distance to said reflector by emitting a beam of radiation towards a portion of the reflector as the shaft and reflector are rotated with respect to the distance measuring unit, the emitted beam being parallel to the rotating shaft, wherein said portion of the reflector has an irregular surface, and wherein the reflector is integrally formed with the rotating shaft and arranged at an end of the rotating shaft and said reflector is substantially cylindrically-shaped and doesn't radially extend beyond an outer surface of the rotating shaft and by receiving a return beam generated when the emitted beam is reflected by the portion of the reflector, the distance measuring unit being configured to output a signal based on a distance of said beam to said portion of the reflector, and determining a rotational position of the rotating shaft based on the output signal of the measured distance of said distance measuring unit.

* * * * *